April 5, 1949.　　　　V. A. HOOVER　　　　2,466,426
DIVE FLAP ACTUATOR AND SYSTEM
Filed Oct. 21, 1944　　　　　　　　　　　　3 Sheets-Sheet 1

Inventor
VAINO A. HOOVER
By Scrivener & Parker
Attorneys

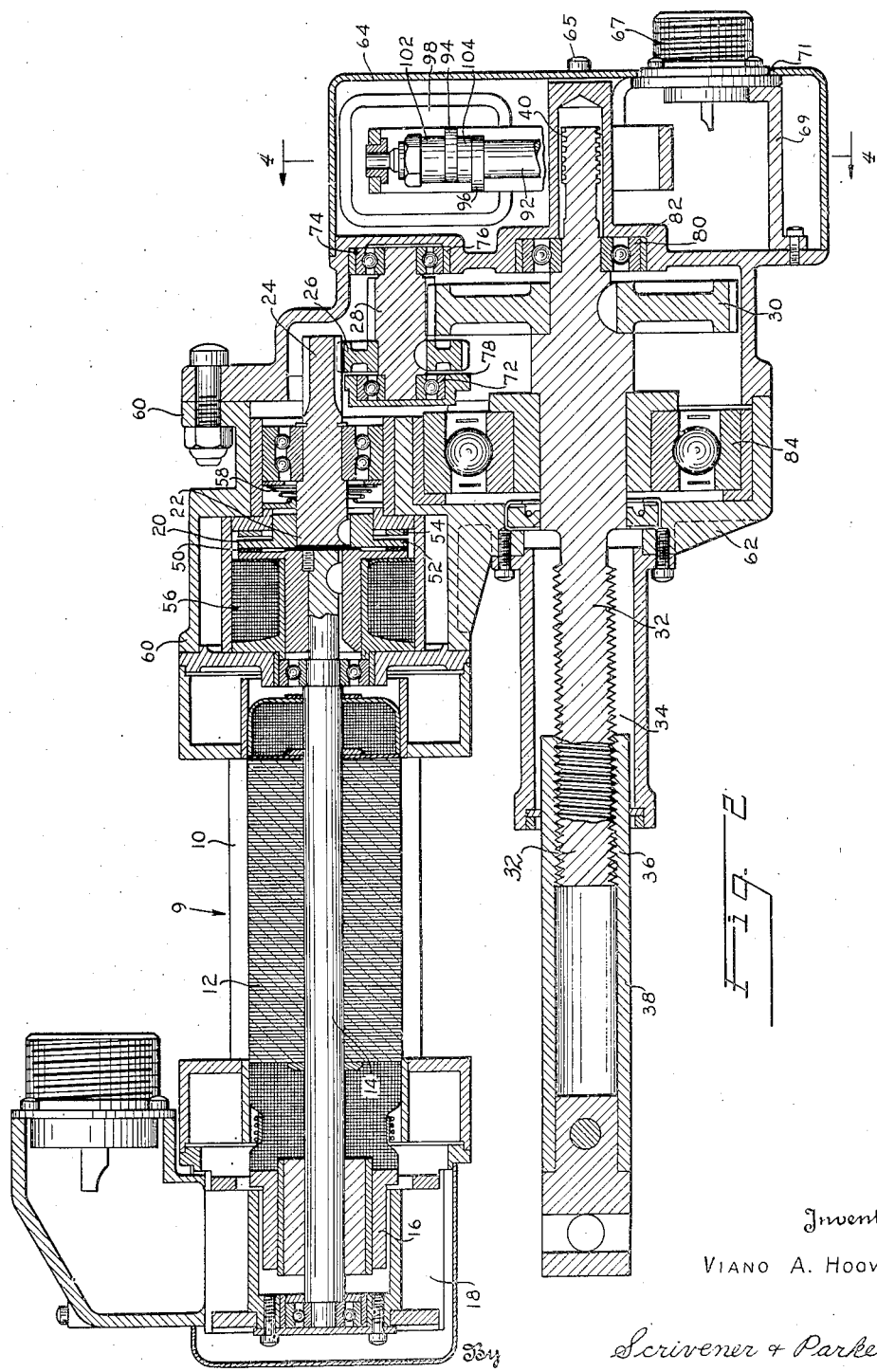

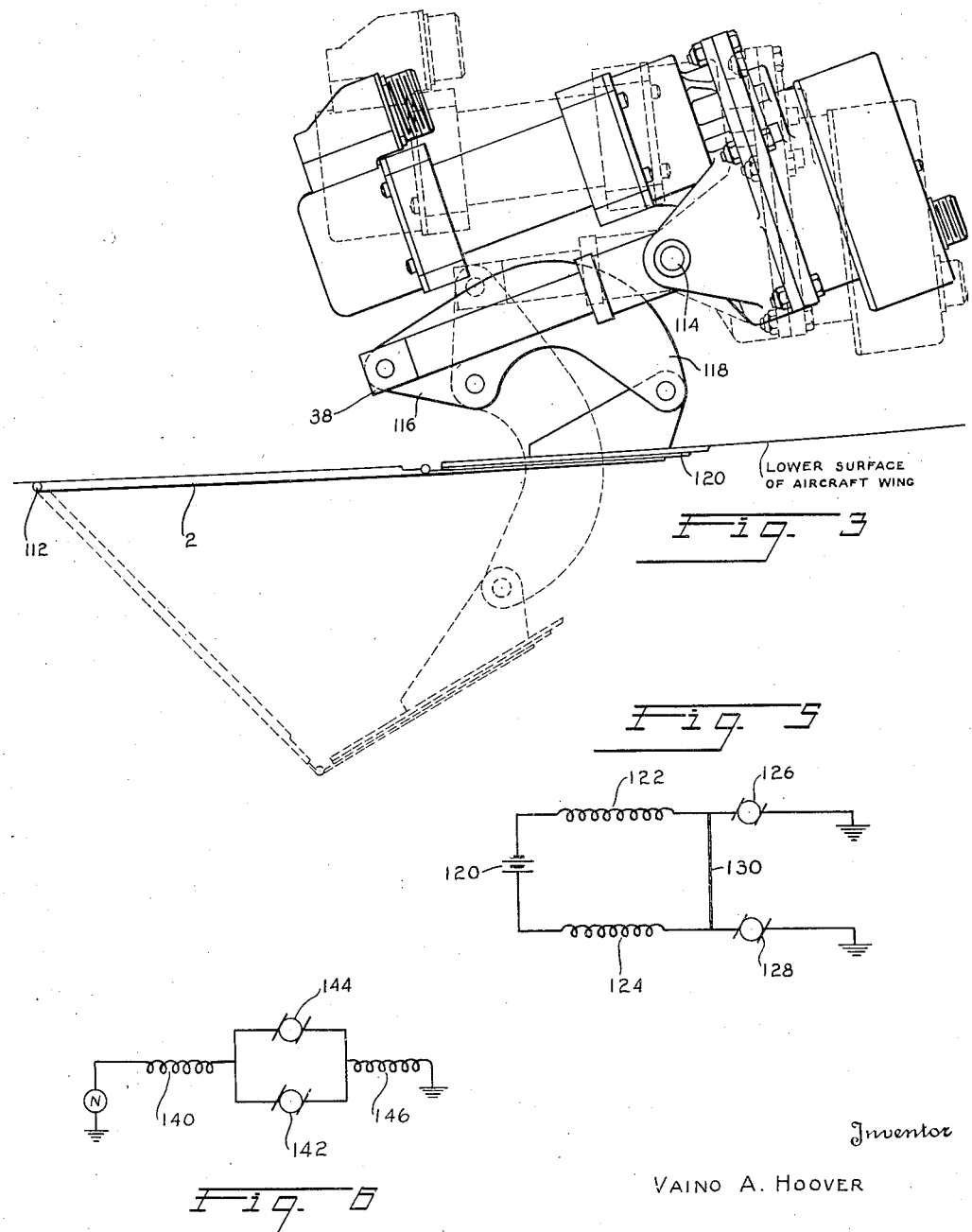

Patented Apr. 5, 1949

2,466,426

UNITED STATES PATENT OFFICE 2,466,426

DIVE FLAP ACTUATOR AND SYSTEM

Vaino A. Hoover, Los Angeles, Calif., assignor to Electrical Engineering and Manufacturing Corporation, Los Angeles, Calif., a corporation of California Application October 21, 1944, Serial No. 559,809

2 Claims. (Cl. 244—42)

1

This invention relates particularly to systems for simultaneously and equally operating two or more movable members and to devices forming part of such systems and adapted and intended to operate on the movable members themselves to effect the movement thereof.

The invention is particularly described in this application as applied to the movement of two so-called dive flaps which, in certain high-speed aircraft, are pivoted to move into and out of the wing surfaces and which, under certain operating conditions, such as diving at high speeds, are moved out of the wing surface into the airstream. It will be apparent that such operation must be effected by application of a force which must not only be very great in order to overcome the pressure of the airstream on the flaps, but which must be steady in order to prevent undesired fluctuation or movement of the flaps. In this connection, it will be seen that the extent of movement of the two flaps must be exactly controlled in order that both will move through the same arc, in the usual case, in order to effect the proper control.

It is one of the principal objects of the invention to provide a system for simultaneously and equally moving such flaps. Another principal object of the invention is to provide a device for moving flaps of the described type, which will exert the required force and will hold the flaps in an entirely steady and unmovable condition in any position to which they are moved.

A still further object is to provide a device of the type described having new and improved features of construction and arrangement resulting in reduced overall size and improved accessibility of parts during operation.

Other objects and features of novelty of the invention will be made apparent by the following description and the annexed drawings which, it will be understood, are only illustrative of the invention and impose no limitation thereon not imposed by the appended claims.

Referring to the drawings, in which similar reference numerals refer to like parts, Fig. 1 is a view showing two aircraft control surfaces and, schematically, the means provided by the invention for operating such surfaces;

Fig. 2 is a sectional view of an operating device according to the invention;

Fig. 3 is an elevational view showing the operating device in its operating and retracted positions;

2

Figs. 5 and 6 are diagrammatic views showing preferred electrical connections between the operating devices for two control surfaces.

Figure 1:
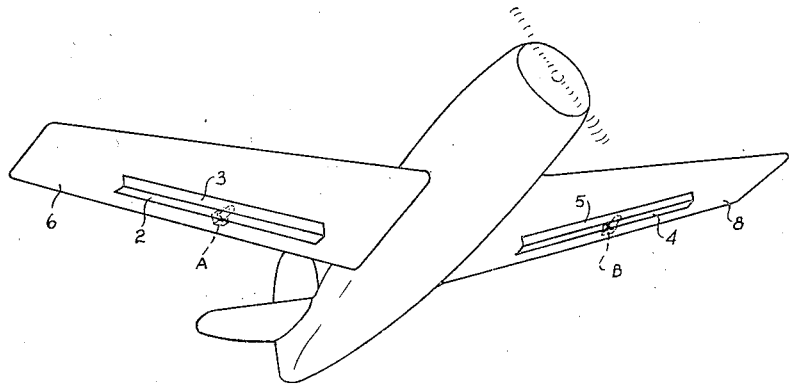

While my invention is of general utility for operating movable devices, it will be described in this application as applied to the operation of dive flaps for aircraft such as those illustrated in Fig. 1, in which the flaps 2, 4 are pivoted along their forward longitudinal edges 3, 5 to the lower surfaces of the wings 6, 8 of an aircraft. These flaps must be operated to open position against the airstream and must be held in any desired opened or closed position against the force thereof. Each of these flaps is operated by an actuator, these being designated A and B in the drawings and one being provided for each flap.

The actuator devices A, B are of identical construction and arrangement. One of these is disclosed in Figs. 2 and 3 and comprises a unitary device which is mounted within the wing section adjacent one of the flaps and in a manner to be more particularly described hereinafter. Each such device embodies an electric motor 9 having a stator 10, armature 12, armature shaft 14, commutator 16 and brush assembly 18. The drive end of shaft 14 is connected through a clutch and brake device 20 to a driven shaft 22 which, on its outer end is formed with pinion gear teeth 24. The pinion 24 meshes with the larger gear 26 of a double spur reduction gear, forming a first gear train. The smaller gear 28 of the double spur reduction gear meshes with a large spur gear 30 which is keyed to the output shaft 32 which at its drive end is provided with an external screw thread 34 which meshes with the concentric internal threaded nut 36 on the operating arm 38 which extends outwardly and co-axially from the output shaft 32. At its opposite end the output shaft is provided with an external worm 40 for a purpose to be described hereinafter.

The clutch and brake device 20 is preferably constructed and operable in the manner described and claimed in my co-pending application Serial No. 509,290 and comprises, in general, a driving disc 50, which is connected to the armature shaft 14, a driven disc 52, which is connected to the driven shaft 24, and a brake disc 54, which is fixedly connected to the housing. Electromagnetic means, 56, which are electrically connected in circuit with the energizing means for the motor, are adapted to operate the driven clutch disc 52 into driving engagement with the driving clutch disc 50 in order to operate the driven shaft, while a spring 58 is arranged to move the driven disc into braking engagement with the brake disc 54 upon deenergization of the electromagnetic clutch-operating means in order to positively stop rotation of the driven shaft. Reference is made to my aforesaid copending application for a more detailed description of the preferred form of clutch and brake assembly.

The clutch assembly and first gear train are enclosed in a housing 60 which is attached to and generally co-axial with the electric motor, and which communicates with a lower housing 62 for the second gear train and part of the operating shaft 32 in order to permit the gears 28 and 30 to mesh. The control end of the operating shaft is also enclosed in a cup-shaped housing 64 which is connected to and extends rearwardly from the housings 60 and 62 and which encloses a control mechanism to be described hereinafter.

The double spur gear 26, 28 of the first gear train is mounted on stub shafts which carry bearing rings 72, 74 respectively one of which is located by a machined bearing seat 76 in the housing 60 and the other end by a bearing retainer 78. The output shaft 32 carries a ball bearing 80 which is located by a machined bearing seat 82 in the housing 62, but the thrust load on this shaft is principally supported by a large bearing 84 of the radial thrust type which can withstand high thrust loads.

Figure 4:
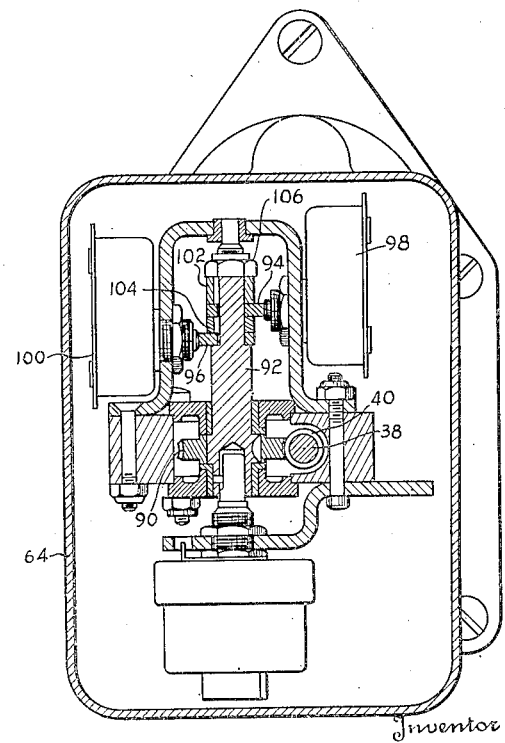
Fig. 4 is a sectional view showing the control means for the operating device, taken on line 4—4 of Fig. 2.

Means are provided by the invention for de-energizing the driving motor of the described assembly, and thereby positively stopping rotation of the output shaft, upon predetermined rotation of such shaft and consequent predetermined longitudinal movement of the operating arm 38, such control means being positioned within the housing 64 and illustrated in Fig. 4 of the drawings. These control means comprise a worm wheel 90, which meshes with the worm 40 on shaft 32, and which is mounted on a rotatably supported control shaft 92. Two axially-spaced cams 94, 96 are mounted on shaft 92 and engage micro-switches 98, 100 both of which are in the circuit of the electric driving motor 9 and are operable to open such circuit when moved by the cams. It will be seen that, because of common operation by output shaft 32, the control unit and the operating arm are interlocked whereby the control unit may be operated to control the driving motor at the retracted and extended positions of the operating arm.

The cams 94, 96 are preferably of the overrunning type having a dwell and a rise, thereby permitting movement of the camshaft 92 after the microswitches have interrupted the motor circuit. The cams are preferably held in place on the camshaft by friction discs 102, 104, which are keyed to the camshaft and locked thereto by stopnut 106. The angular positions of the cams on the camshaft may be adjusted in order to vary the absolute positions of the operating arm 38 at which the electric motor is de-energized.

Means are provided by the invention for operating each dive flap by the device described hereinbefore and in Fig. 3 of the drawings there is disclosed the preferred assembly and arrangement of these operating and operated parts. In such figure there is illustrated a part of the section of an aircraft wing, to the lower surface of which the leading edge of a flap 2 is pivotally connected at 112. An operating device which is constructed and operable in the manner hereinbefore described is pivotally mounted within the wing section on a bar 114 which extends longitudinally of the wing. The operating arm 38 of such device is pivotally connected to the shorter arm 116 of a bell-crank lever which is pivotally supported within the wing section above the flap 110, and the longer arm 118 of which is pivotally connected to one end of a connecting arm 120, the other end of which is connected to the free edge of the flap.

In the operation of the invention, if it is desired to move the flaps 2, 4 from their normal retracted positions, in which they lie in the lower wing surface, to their extended positions, as illustrated in dotted lines in Fig. 4, the electric motor 9 of the operating device is energized, thus rotating the output shaft 32 through the described gear trains and imparting longitudinal movement to the operating arm 38 through the engagement of thread 34 with nut 36. The parts are so arranged that such longitudinal movement will be inward or to the right as viewed in Fig. 3, thus moving the bell-crank lever in a clockwise direction and moving the free edge of the flap away from the lower wing surface. The flap is thus moved to its extended position about its pivotal support.

Rotation of the output shaft 32 will not only cause movement of the operating arm but will also rotate the worm wheel 90 and cam-shaft 92, thus causing one of the cams 94, 96 to operate its associated micro-switch at a predetermined point in the rotation of the output shaft, thus de-energizing the operating motor. Interruption of the motor-energizing current will also de-energize the clutch-operating coils 56 whereby the spring 58 will move the driven clutch disc 52 into contact with the brake disc 54, thus firmly locking the parts against movement.

The arrangement and disposition of parts of the actuator device provides new and advantageous results. It will be seen, for example, that the screw shaft 34 is parallel to the motor shaft and projects in the same direction from the gear housing 60, whereby the two shafts are in side-by-side relation. By reason of this construction and arrangement the overall space required by the device is reduced to a minimum, this being a very important consideration in assemblies such as that described, in which the actuator moves about the fixed pivot 114 in operating the flap. The space available for the actuator device is limited by the upper and lower wing surfaces and the minimum overall dimensions of the described actuator are therefore very advantageous.

Further novel and advantageous features of the invention permit improved accessibility of the cams 94, 96 and other elements of the control mechanism. These parts are housed within the cup-shaped cover 64 which is removably attached to the face of the main gear housing by screw 65. Electric leads are admitted into the cover 64 through a connection plug 67 which is supported internally of the cover 64, as at 69, and extends through an enlarged opening 71 in the cover. It will be seen that by removing the screws 65 the cover 64 may be removed without in any way disturbing the plug 67 or the electrical connections which extend through it to the parts within the cover. The unit may therefore be operated with the cover 64 removed, whereby the adjustment of the cams may be effected while the motor is being operated.

Means are provided by the invention for causing simultaneous and equal operation and movement of the two flaps 2, 4 or other similar devices with which the invention may be utilized. Such means are illustrated in Fig. 5 in which there is illustrated an electric circuit for the electric motors of the two devices which operate the flaps. In such circuit there is a source of energy 120, such as a battery or a direct-current generator, the two field windings 122, 124 and the armatures 126, 128 of the two motors. In order to provide simultaneous and equal operation of the two motors an electrical bus-connection 130 is made between the series fields thereof, thereby keeping the electrical current in the fields of the two motors substantially equal and therefore the speeds of rotation thereof substantially equal.

In Fig. 6 there is illustrated a second circuit diagram which produces the same results as that disclosed in Fig. 5. In this circuit the armatures of the two motors are connected in parallel between the series-connected field windings 144, 146.

While I have described and illustrated certain embodiments of my invention, it will be apparent to those skilled in the art that other embodiments may be made as well as modifications of those disclosed, all without departing in any way from the spirit or scope of the invention, for the limits of which reference must be had to the appended claims.

I claim:

1. A dive-flap operating device comprising an electric motor having a rotatable armature and armature shaft, an output shaft parallel to the armature shaft and in side-by-side relation thereto, reduction gearing connecting adjacent ends of said shafts, a housing for said gearing, a control means for the motor disposed externally of the housing, a cover for the control means attached to said housing and having an aperture therein, an electrical connection plug disposed within said aperture but being separate from the cover, and means separate from the cover for supporting said plug.

2. In combination with an aircraft wing and a flap pivoted at its leading edge in a surface of the wing, means for operating said flap comprising a bell-crank lever pivoted between its ends to a fixed part within the wing adjacent the flap and connected at its one end to the flap for operating the same to extended and retracted positions, and an operating device for said bell-crank lever pivotally mounted on a fixed part within said wing and comprising an electric motor having a rotatable armature, an operating arm having its outer end connected to the second end of the bell-crank lever and being parallel and in side-by-side relation to said armature, and means connecting said armature to said operating arm for moving the operating arm upon operation of the motor to rotate the bell-crank lever about its pivot and move the flap.

VAINO A. HOOVER.

REFERENCES CITED

The following references are of record in the file of this patent:

UNITED STATES PATENTS

| Number | Name | Date |
| --- | --- | --- |
| 545,111 | Thomson | Aug. 27, 1895 |
| 2,119,305 | Zaparka | May 31, 1938 |
| 2,164,531 | Lee | July 4, 1939 |
| 2,170,886 | Zaparka | Aug. 29, 1939 |
| 2,315,110 | Dornier | Mar. 30, 1943 |
| 2,328,897 | Gill | Sept. 7, 1943 |
| 2,360,333 | De Port | Oct. 17, 1944 |
| 2,361,574 | Tampier | Oct. 31, 1944 |
| 2,366,734 | Lear | Jan. 9, 1945 |
| 2,375,422 | Leland | Apr. 3, 1945 |
| 2,387,799 | Leland | May 8, 1945 |

FOREIGN PATENTS

| Number | Country | Date |
| --- | --- | --- |
| 503,022 | Great Britain | Mar. 29, 1939 |